R. P. GILLETT.
Scrubbing Brush.
No. 56,035.
Patented July 3, 1866.
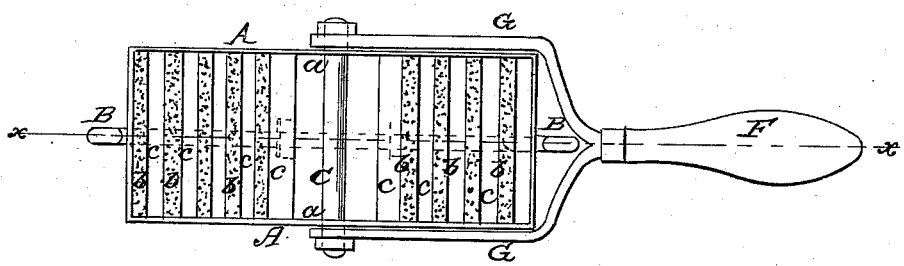
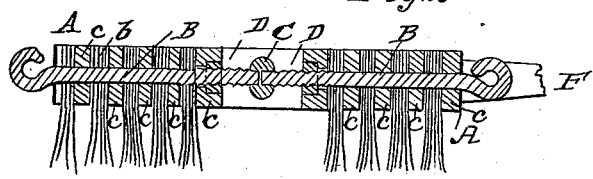

UNITED STATES PATENT OFFICE.

R. P. GILLETT, OF SPARTA, WISCONSIN.

IMPROVED SCRUBBING-BRUSH.

Specification forming part of Letters Patent No. 56,035, dated July 3, 1866.

*To all whom it may concern:*

Be it known that I, R. P. GILLETT, of Sparta, Monroe county, State of Wisconsin, have invented new and useful Improvements in Brushes; and I do hereby declare that the following is a full, clear, and exact description thereof, which will enable others skilled in the art to make and use the same, reference being had to the accompanying drawings, forming part of this specification.

The present improvements are more especially applicable to scrubbing-brushes; and they principally consist in arranging within a suitable frame a series of parallel layers of bristles, broom-corn, or any other material ordinarily used for brushes, with a cross block or piece between each layer, through which layers and cross-blocks two bolts pass, meeting in a common center cross-bar of the frame, in which they loosely turn, each bolt being provided with a nut on its inner end, so that by turning the said bolts in the proper direction their nuts will be brought to bear against the inner cross-pieces of the frame, and thus tightly and firmly bind them and the layers of bristles between them together and in and to the frame.

In the accompanying plate of drawings my improvements are illustrated, Figure 1 being a plan or top view of a scrubbing-brush made according thereto; and Fig. 2, a central vertical section taken in the plane of the line $x\ x$, Fig. 1.

Similar letters of reference indicate like parts.

A in the drawings represents a band made of iron or suitable metal bent around into a square or rectangular shape, forming a frame, which, for a scrubbing-brush, should be about seven inches in length to four in width, the band being one or more inches in width. Between the sides $a\ a$ of this band-frame, and extending from one to the other at each end of the frame, are arranged a series of layers, $b\ b\ b$, of bristles, broom-corn, or any other of the materials ordinarily used for a scrubbing-brush, with a cross piece or block, $c$, of wood or other suitable material between each layer of bristles, of about the same thickness as the same, these alternate layers of bristles and cross-blocks extending toward and nearly to the central portion of the frame, with the layers of bristles projecting from the under side thereof, as plainly shown in Fig. 2.

B B are two screw-bolts passing loosely through the centers of each series of bristles and blocks, arranged together, as above explained, and meeting at and in a common center cross-bar, C, of the band-frame A, in which they loosely turn, each bolt having a nut, D, countersunk in the inner one of the series of bristle-blocks, so that by turning the said bolts in the proper direction their respective nuts are caused to tightly bear against and hold the series of bristles and blocks firmly together and in and to their common frame, to remove any of which bristles when they have become worn from use, and to insert new bristles, it is only necessary to loosen the said nuts by properly turning the bolts therefor, when, having inserted the new bristles they are again tightened as before. These bolts B pass loosely through the band-frame A at each end, and, for convenience in turning them, are bent over into the shape of an eye, as seen in the drawings.

F is the handle of the brush, made of such a length as to enable the brush to be conveniently used in a standing position, which handle is hung by a bifurcated metallic arm, G, secured to its lower end, to and upon the outer ends of the center cross-bar, C, of the band-frame, so as to freely swing thereon, thus enabling the brush to be squarely and flatly brought to bear throughout its whole length upon the floor or other surface that is to be scrubbed, whether the handle is inclined more or less thereto, as may be most convenient for the person to use it.

What I claim as new, and desire to secure by Letters Patent, is—

The combination of the frame A, alternate layers of bristles $b\ b$, or their equivalents, and cross-blocks $c$, screw-bolts B, having nuts D, and center cross-bar, C, when arranged together so as to operate in the manner and for the purpose described.

The above specification of my invention signed by me this 18th day of December, 1865.

R. P. GILLETT.

Witnesses:
  GEORGE E. PRATT,
  S. D. HOLLISTER.